Oct. 4, 1932.   E. W. DAVIS   1,880,852
LUBRICATING SYSTEM
Filed Aug. 23, 1924   2 Sheets-Sheet 2
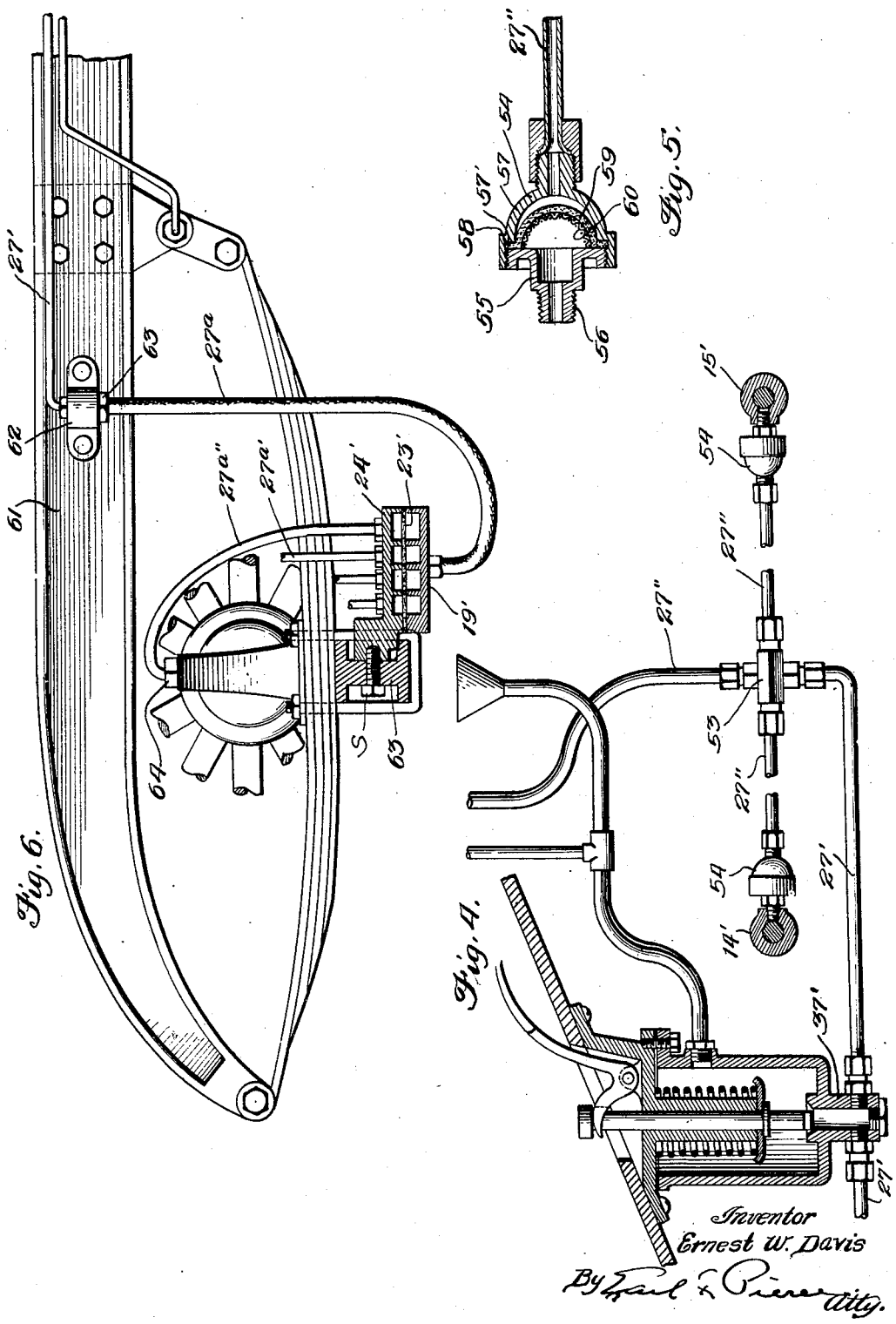

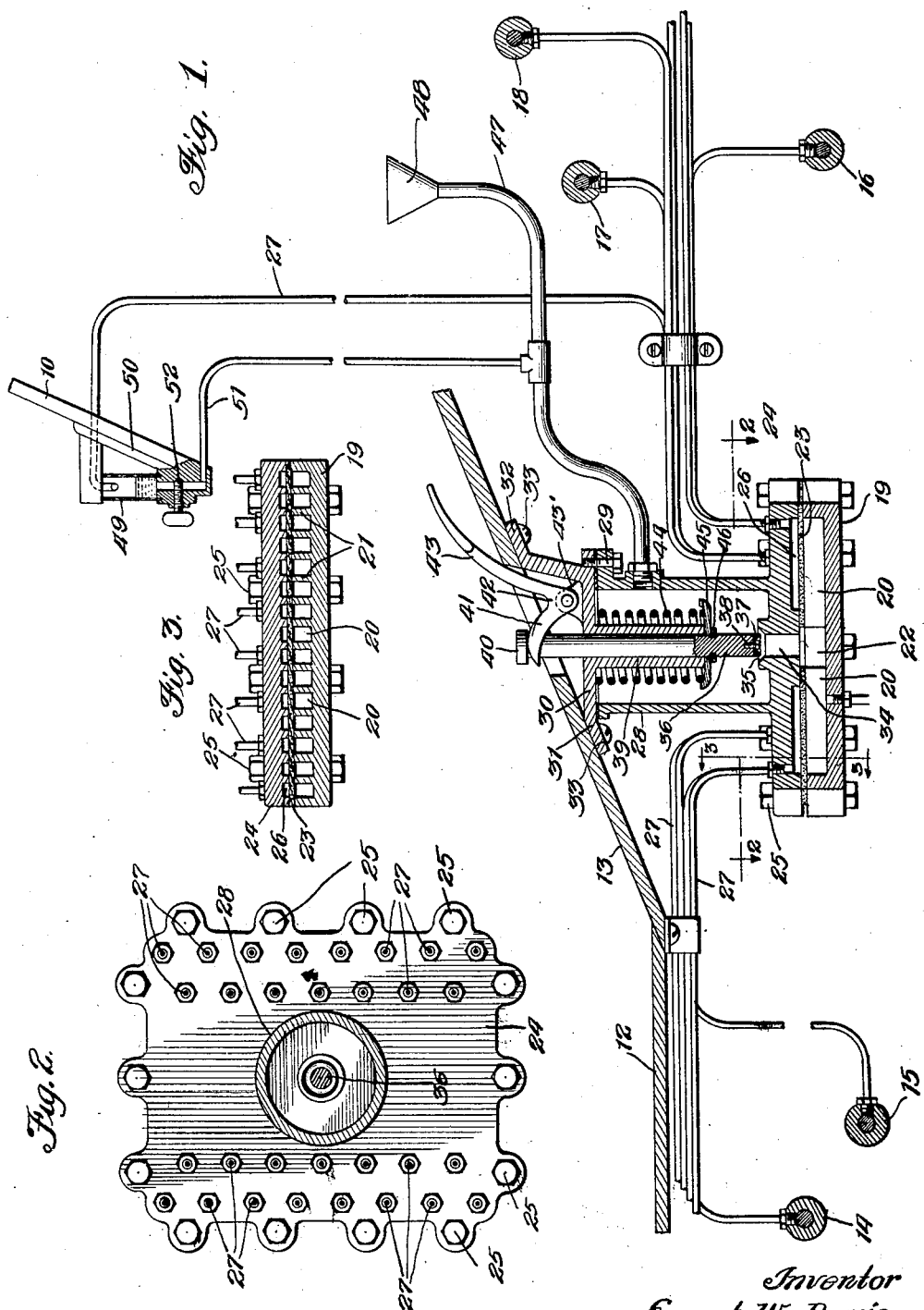

Patented Oct. 4, 1932

1,880,852

UNITED STATES PATENT OFFICE

ERNEST W. DAVIS, OF OAK PARK, ILLINOIS, ASSIGNOR TO ALEMITE CORPORATION, OF CHICAGO, ILLINOIS, A CORPORATION OF DELAWARE

LUBRICATING SYSTEM

Application filed August 23, 1924. Serial No. 733,765.

My invention relates to improvements in lubricating systems, and is particularly concerned with the provision of an novel system for lubricating the chassis bearings of an automobile or other automotive vehicle. It is to be clearly understood, however, that my invention is not limited to this particular adaptation or use, but may be used for lubricating any kind of machinery.

The objects of my invention are:

First: To provide a lubricating system in which one or more bearings can be lubricated from a single point.

Second. To provide a lubricating system by means of which one or more bearings can be lubricated with a single effort on the part of the operator.

Third. To provide a lubricating system comprising a plurality of bearings to be lubricated, a single source of lubricant under pressure, and means for conducting the lubricant from the source to the several bearings.

Fourth. To provide a lubricating system such as described comprising means for automatically proportioning the lubricant in accordance with the demand of the several bearings.

Fifth. To provide a lubricating system such as described, comprising means for preventing dirt, water, and other foreign matter from entering and clogging the pipe or conduit leading to the bearings; and Sixth: To provide a system of the character described, that is simple in construction, economical to manufacture, and easy to operate.

Other objects of my invention will appear as this description progresses, reference being had to the accompanying drawings, in which:

Figure 1 is a more or less diagrammatic view, partially in section, showing certain details of construction of one embodiment of my invention.

Figure 2 is a section taken on line 2—2 of Figure 1.

Figure 3 is a section taken on line 3—3 of Figure 1.

Figure 4 is a view similar to Figure 1, but showing a modified form of my invention.

Figure 5 is a longitudinal section of one of the devices that are attached to the bearings to be lubricated, in that form of the invention shown in Figure 4, and Figure 6 is another view similar to Figure 1, but showing another modified form of my invention.

Throughout the several views similar reference characters are used for referring to similar parts and the sections are taken looking in the directions of the small arrows.

In that embodiment of my invention illustrated in Figures 1 to 3 inclusive, I have shown portions of the dash 10 and the floor boards 12 and 13. I have also shown diagrammatic views of the bearings 14, 15, 16, 17, and 18 that are intended to represent certain chassis bearings to be lubricated by the means about to be described. The pump forming a part of my invention, comprises a base plate 19, having a series of parallel grooves 20 corresponding in number to the number of bearings to be lubricated. The partitions 21 separating the grooves 20, are cut away adjacent the center thereof, to form a longitudinally extending passageway 22, to connect or establish communication between all of the grooves 20.

A sheet of leather 23, covers the open sides of the grooves 20, and is clamped to the base plate by means of the cover plate 24 and suitable bolts, or screws 25.

The lower face of the cover plate 24 has a plurality of grooves 26 formed therein and positioned opposite to the grooves 20 in the base plate.

A conduit 27 extends from each of the grooves 26 to one of the bearings to be lubricated. For the purpose of supplying lubricant under pressure to the several bearings 12 to 18 inclusive, I provide a reservoir or receptacle 28 which is adapted to hold a quantity of lubricant sufficient to lubricate a vehicle for any desired period of time. This reservoir is preferably made integral with the cover plate 24 and has secured thereto, by means of screws 29, the cap 30, that has projecting therefrom lugs or brackets 31 and 32. Screws 33 secure these lugs or brackets to the floor board 13 and in this manner the reservoir 28, the base plate 19, cover plate 24 and the pump mechanism about to be described are supported from the floor board 13.

The cover plate 24 is provided with a central bore 34 that extends therethrough, and opens into the passageway 22. Preferably the upper end of the bore 34 is counterbored as shown in 35, to insure the proper registration of the inner end of the plunger 36. The plunger 36 preferably terminates in a cup-leather 37 that is held in place by means of the screw 38. The plunger 36 is reciprocably mounted in the cap 30 and the inwardly extending tubular bearing 39. At its outer end, the plunger is provided with a head 40 that is engaged by the bifurcated end of the bell crank lever 42. This lever is pivotally mounted upon a lug 43' extending upwardly from the cap 30 and comprising a central arm 43 that extends upwards above the floor board 13, so that the operator, by pushing upon this lever with his foot or hand can lift the plunger 38 to the position shown in Figure 1, against the tension of the spring 44 that surrounds the bearing 39. One end of this spring contacts with the cap 30, and the other end abuts the disk 45 that surrounds the plunger 36 and is supported by the pin 46 extending through the plunger 36.

From the above description it will be apparent that when the plunger is lifted to the position shown in Figure 1, lubricant, which is preferably oil, will pass from the reservoir 28, through the bore 34 and into the groove 20. When all of the grooves and the bore 34 have been filled and the operator releases pressure upon the lever 43, the plunger 36 will move downwardly into the bore 34 under tension of the spring 44 and thereby displace the lubricant in the bore 34. The lubricant thus displaced will cause a corresponding displacement of lubricant through the leather septum 23 and into the grooves 26. When the system is first placed in operation it will be necessary for the operator to repeat the operation just described a number of times in order to fill the various conduits with lubricant, but thereafter, as soon as the plunger 36 moves into the bore 34, lubricant will be forced into the several conduits 27 and into the various bearings to be lubricated.

As described above, my system is particularly adapted to be used for lubricating the chassis bearings of an automobile or other automotive vehicle, in which the resistances of the several bearings, to the passage of lubricant therethrough, vary through a comparatively wide range. One bearing may require practically no pressure to insure the passage of oil therethrough, while another bearing may require a pressure of from 10 to 40 or 50 pounds per square inch to insure its proper lubrication.

To make certain that each bearing will receive its proper share of lubricant, I make use of a filtering material 23 the resistance of which is high compared to the resistance of various bearings. I have found that for this purpose, oak-tanned, snuff-grained, cowhide of approximately $\frac{3}{16}$ of an inch in thickness is satisfactory.

My invention is not, however, limited to the use of this particular material but contemplates the use of any material having sufficient porosity to permit the passage of lubricant, but at the same time, having a resistance that is high compared with the resistance of any one of the bearings to be lubricated. For instance, if the maximum pressure required for lubricating a bearing is 40 or 50 pounds per square inch, I prefer to make use of a material that will require a pressure of from 100 to 250 pounds per square inch to insure the passage of lubricant therethrough and into the bearing. In this manner, that is, in making the resistance of the filter high, as compared to the resistance of the several bearings, I am enabled to insure the proper proportioning of the lubricant to the various bearings.

For filling the reservoir 28, I prefer to provide a pipe 47 that leads through from some point that is easily accessible. The upper end of this pipe preferably terminates in a funnel 48. I prefer to include in the system visible means for indicating to the operator that the system is, or is not, operating properly, and for this purpose I carry one end of one of the pipes 27 to the upper end of a sight feed glass 49, supported by a suitable bracket 50 located on the dash 10. A pipe 51 leads from the lower end of the sight feed glass 49 to the pipe 47 so that any lubricant passing through the sight feed glass can be returned to the receptacle 28.

By observing whether or not oil drips from the end of the pipe 27 into the sight feed glass 49 when pressure has been applied, and then released, from the lever 43, the operator can ascertain whether the system is functioning properly. For the purpose of warning the operator when the supply of lubricant in the reservoir 28 is about to become exhausted, I prefer to place a valve 52 at the lower end of the sight feed glass 49 so as to retain the oil in the sight feed glass, that is discharged therefrom by the pipe 27. By properly proportioning the capacity of the sight feed glass 49, and the area of the filtering material controlling the passage of lubricant to the pipe 27, the pipe or column of oil trapped in the sight feed glass 49 can be made to bear a certain relation to the quantity of lubricant in the reservoir 28, so that the operator will know that when the level of the oil in the sight feed glass 49 reaches a certain point, the lubricant in the reservoir 28 is substantially exhausted.

When the reservoir 28 is filled, the operator by opening the valve 52 can permit the oil to drain from the sight feed glass 49 back into the receptacle and, by then closing the valve, can place the apparatus in condition to indicate to the operator the quantity of oil or lubricant remaining in the reservoir 28.

In the embodiment of my invention disclosed in Figures 4 and 5, I dispense with the base and cover plates 19 and 24 respectively, and connect a plurality of conduits 27' directly with the lower portion of the pump cylinder 37'. Otherwise the pump construction is the same as that described above.

Preferably, each of the conduits 27' connect with a union 53, to which are connected various branch conduits 27", that terminate in fittings indicated as a whole by reference characters 54. These fittings are connected in any suitable way with the several bearings 14' and 15' that are to be lubricated.

These fittings each comprise a base portion having a bearing and a semi-spherical cap portion 57 that is threaded onto the outer end of the base. The peripheral flange 58 of the resistance and filtering element 59 is clamped between the shoulder 57' on the cap, and the base as shown in Figure 5. The central portion of the filter and resistance element is supported by a concave-convex element 60, preferably of screen or any other suitable reticulated material. As shown in Figure 5, sufficient space is left between the cap 57 and the element 59 to permit the oil or lubricant to have ready access to the surface of the element 59. The system just described functions in substantially the same manner as that disclosed in Figures 1 to 3 inclusive. Substantially the only difference between these two systems is that in one the filtering element is common to all the conduits, whereas, in the other system each conduit terminal is provided with a filter and resistance element. In the system involving the latter construction, the filter and resistance elements are proportioned so as to offer the proper relative resistance to the flow of the lubricant.

In Figure 6, I have illustrated a construction that may be used with either of the systems described. This system is designed particularly for use upon parts of an automobile or other mechanism that moves relatively to that part of the automobile or mechanism upon which the lubricant pump is mounted. In some forms of my invention a conduit leads from the lubricant pump similar to that heretofore described, and is supported on a side member 61 of the automobile chassis by a clip 62, or in any other suitable manner. This clip also supports a union 63 for connecting the conduit 27 with a section of flexible conduit 27a that in turn connects with the base plate 19' similar to that shown in Figures 1 to 3 inclusive. A cover plate 24' is secured to the axle 63 by means of a screw S and a base plate 19' coacts with a porous septum 23' that is attached to cover plate 24', all of these parts being similar to the parts shown in Fig. 1. Suitable conduits 27a connect the grooves and cover plate with the various bearings carried by the axle 63, as for instance, a king-pin bearing 64.

By making use of "headers" similar to that formed by the base plate 19', septum 23', and cover plate 24' that are carried by relatively moving parts, I am enabled easily to supply lubricant to such bearings, without the necessity of making use of a flexible conduit for each of the bearings.

While I have described the details of construction of the preferred embodiment of my invention, it is to be clearly understood that my invention is not limited to these details, but is capable of other adaptations and modifications, within the scope of the appended claims.

Having thus described my invention, what I claim is:

1. A lubricating system comprising a plurality of bearings, a pump, a chamber for each bearing having a wall comprising a stationary leather permeable septume, said septum having a resistance several times as great as the resistance of the bearing, means for conducting oil under pressure to the outer face of each septum, and a conduit leading from each chamber to its bearing.

2. A lubricating system comprising a plurality of bearings, a displacement pump for supplying lubricant to said bearings, a conduit leading from said pump to each of said bearings, and a stationary premeable leather septum interposed in said conduit, said septum having a resistance to flow which is several times as great as the one of said bearings having the highest resistance.

3. A lubricating system comprising a plurality of bearings, conduits for carrying lubricant under pressure to said bearings, a displacement pump for supplying lubricant to said conduits, a high resistance filtering means in each of said conduits, said means comprising a leather septum having an area many times greater than the cross sectional area of the conduit and having a resistance to flow several times as great as that of the one of said bearings having the highest resistance.

4. A lubricating system comprising a plurality of bearings, conduits for carrying lubricant under pressure to said bearings, a displacement pump for supplying lubricant to said conduits, a high resistance filtering means in each of said conduits, said means comprising a stationary leather septum having a resistance to flow several times as great as that of the one of said bearings having the highest resistance.

5. A lubricating system comprising a plurality of bearings, conduits for carrying lubricant under pressure to said bearings, a displacement pump for supplying lubricant to said conduits, a stationary high resistance filtering means in each of said conduits, said means comprising a leather septum having a resistance to flow several times as great as that of the one of said bearings having the highest resistance and adapted to resist the flow of lubricant during the pumping operation.

In witness whereof, I hereunto subscribe my name this 18th day of August, 1924.

ERNEST W. DAVIS.